(12) United States Patent
Al-Sheikhly et al.

(10) Patent No.: US 8,470,166 B2
(45) Date of Patent: Jun. 25, 2013

(54) RADIATION PROCESSING OF HEAVY OILS

(75) Inventors: Mohamad Al-Sheikhly, Potomac, MD (US); Joseph Silverman, Chevy Chase, MD (US)

(73) Assignee: PetroRadiant, Inc., Germantown, MD (US)

( * ) Notice: Subject to any disclaimer, the term of this patent is extended or adjusted under 35 U.S.C. 154(b) by 320 days.

(21) Appl. No.: 12/520,389

(22) PCT Filed: Dec. 21, 2007

(86) PCT No.: PCT/US2007/088578
§ 371 (c)(1),
(2), (4) Date: Jun. 19, 2009

(87) PCT Pub. No.: WO2008/080072
PCT Pub. Date: Jul. 3, 2008

(65) Prior Publication Data
US 2009/0308789 A1    Dec. 17, 2009

Related U.S. Application Data

(60) Provisional application No. 60/871,651, filed on Dec. 22, 2006, provisional application No. 60/945,456, filed on Jun. 21, 2007.

(51) Int. Cl.
*C10G 1/00* (2006.01)

(52) U.S. Cl.
USPC ............... 208/402; 208/27; 208/85; 208/133; 204/157.15; 204/157.44

(58) Field of Classification Search
USPC ................. 208/402, 27, 85, 133; 204/157.15, 204/157.44
See application file for complete search history.

(56) References Cited

U.S. PATENT DOCUMENTS

| | | | |
|---|---|---|---|
| 2,951,022 A | 1/1957 | Hartzband et al. | |
| 2,845,388 A * | 7/1958 | Weisgerber et al. | 204/157.15 |
| 2,962,431 A * | 11/1960 | Gladrow | 204/157.15 |
| 3,153,622 A | 10/1964 | Humphrey et al. | |
| 3,342,261 A * | 9/1967 | Bond | 166/305.1 |
| 3,687,629 A | 9/1972 | Walkins | |
| 4,274,934 A | 6/1981 | Compton | |
| 4,431,511 A | 2/1984 | Olmstead | |
| 4,465,606 A * | 8/1984 | On, Jr. | 208/18 |
| 4,485,007 A | 11/1984 | Tam et al. | |
| 4,585,063 A | 4/1986 | Venardos et al. | |
| 4,772,379 A | 9/1988 | Gomberg | |
| 6,231,749 B1 | 5/2001 | Degnan et al. | |
| 7,201,838 B2 | 4/2007 | Bishop et al. | |
| 7,344,631 B2 | 3/2008 | Bishop et al. | |
| 2002/0030022 A1* | 3/2002 | Bradley | 210/752 |
| 2003/0128807 A1* | 7/2003 | Kotler et al. | 378/64 |
| 2006/0254126 A1 | 11/2006 | Butler et al. | |
| 2007/0075271 A1* | 4/2007 | Faber | 250/491.1 |
| 2007/0158239 A1 | 7/2007 | Satchell | |
| 2007/0284285 A1 | 12/2007 | Stepanik et al. | |
| 2008/0217261 A1 | 9/2008 | Kapila et al. | |
| 2010/0051444 A1 | 3/2010 | Zaikin et al. | |

FOREIGN PATENT DOCUMENTS

WO    2007 070698    7/2007

* cited by examiner

*Primary Examiner* — Prem C Singh
*Assistant Examiner* — Michelle Stein
(74) *Attorney, Agent, or Firm* — Mary B. Tung; Davis, Agnor, Rapaport & Skalny, LLC

(57) ABSTRACT

The present invention is drawn to a method of processing heavy paraffinic oils or heavy aromatic oils using radiation chemistry of polyethylene under oxidizing conditions. The process of the invention will result in a chain reaction for oxidative scission as the basis for a radiation processing for heavy paraffinic or aromatic oils. The method of the invention will allow for the cost-efficient and environmentally-friendly processing of heavy oils into lighter petroleum products.

13 Claims, No Drawings

RADIATION PROCESSING OF HEAVY OILS

BACKGROUND

1. Field of the Invention

This invention relates to radiation processing of heavy oils.

2. Background of the Invention

Heavy oils are petroleum deposits that hold promise for the large scale production of products that can be utilized as fuel oil and petroleum based products. Ultimately, heavy oil and bitumen are used to make the same petroleum products as conventional forms of crude oil; however, more processing is required. In 2002, heavy oil, synthetic oil and crude bitumen accounted for almost 60 percent of total Canadian crude oil production. (Canadian Centre for Energy Information, web page, 2006). Canadian reserves include the tar sands fields near Ft. McMurray Alberta, Canada (estimated to contain 174-311 billion recoverable barrels).

Large deposits also occur in Russia, Khazakstan (such as the Kumkol, Karazhanbas (311 Million barrels; Zaykina et al. *Rad. Phys. Chem.* 20:211-221, 2001; Zaykin, Zaykina and Silverman, *Rad. Phys. Chem.* 69:229-238, 2004), and Akshabulak fields (oil sands)), Brazil, USA (in the form of shale oils), and bitumen from Mexico and from the Orinoco Belt in Venezuela (estimated to contain 200-270 Billion barrels). However, their viscosity limits their use and methods to lower viscosity can be both costly and harmful to the environment. These oil resources, however, require three to four times the cost of conventional light oil to extract and can have detrimental effects on the environment.

Extraction of heavy oil petroleum deposits often involves heating a heavy oil mixture, such as in U.S. Pat. No. 7,077,198, wherein one or more heat sources may be used to heat a portion of the hydrocarbon containing formation (shale oil) to temperatures that allow pyrolysis of the hydrocarbons.

Paraffinic polymers such as polyethylene undergo degradation when exposed to low dose rates of ionizing radiation while in the presence of air. (Charlesby A., *J. Am. Chem Soc.*, pp. 60-74, 1953) The degradation products and their yields are a function of the dose, dose rate, oxygen concentration, temperature, polymer morphology, branching ratio, degree of unsaturation and polymer processing additives. While the literature is not extensive enough to provide a detailed model that takes into account all these factors and their nonlinear interactions, it is clear that the information currently available can be profitably applied to a related but more important problem, namely, the radiation-induced oxidative conversion of heavy liquid paraffinic petroleum to products with lower molecular weight distribution.

Published works describe poor success in using ionizing radiation to "degrade" the paraffins; the emphasis in all such works is on high dose rate and/or high temperature and pressure. (Petermann and Gleiter, *Kolloid-Z u. Z. Polymere* 251: 850-856, 1973; Ungar and Keller, *Polymer*, 21:1273-1277, 1980: Katsumura, Y. Die *Angewandte Malcromolekulare Chemie* 252:89-101, 1997; Seguchi, T. et al., *Rad. Phys. Chem.* 37:29-35, 1991) The results are so unpromising as to lead one of the leading experimentalists in the field to declare that normal paraffinic oils and polymers are for all practical purposes inert to ionizing radiation. (Review in: "A literature Review on Cold Cracking of Petroleum Crude Oil," U.S. Dept. of Energy, July 2006). Seguchi et al. (ibid, page 35) stated that n-paraffins should behave similarly to polyethylene and state that there is "no clear evidence that main-chain scission occurs in linear polyethylene upon irradiation" and "main chain scission in both polyethylene and ethylenepropylene copolymer is negligible."

Much of the current literature describes either eliminating or reducing paraffinic oils or dewaxing processes for producing very high viscosity index, low pour point lubricating oil base stocks from a mineral oil feed (see U.S. Pat. No. 7,074,320).

Electron beam technology has been used in the treatment of contaminated liquids (see U.S. Pat. No. 5,807,491) and has been suggested for the processing of liquids, including petroleum products (see U.S. Pat. No. 5,530,255). Zaykina et al. (2001, ibid) show temperature and dose rate effects on the radiation chemistry of oil from the Karazhanbas oil field. For experiments utilizing a temperature of 450° C., and a dose rate of 5 kGy/sec, doses up to 6 kGy resulted in isomerization, whereas at 375° C. and a dose rate of 25 kGy/sec, the same doses led to "intense molecular destruction." Mirkin et al., (*Rad. Phys. Chem.* 67:311-314, 2003) and Zaykin et al., (*Rad. Phys. Chem.* 67: 305-309, 2003) discuss the use of temperatures of 350-420° C., and a pressure of nearly 1 atm. Zaykin and Zaykina, (*Rad. Phys. Chem.* 71:469-472, 2004) discusses thermal processing at 350° C. with a combination of ozonolysis and irradiation with 2 MeV electrons from a linear accelerator. The U.S. Department of Energy report (Ibid, page 13, 2006) asserts that the analysis in the Zaykin et al. 2004 study included high octane gasoline due to the presence of a higher isoparaffin content, but "lacked a quantitative mass balance to account for the other hydrocarbon fractions" and "the stability of the gasoline fraction was not reported."

Zaykin et al., (Zaykin, Zaykina and Silverman, *Rad. Phys. Chem.*, 69:229-238, 2004) discusses the radiation-thermal conversion of paraffinic oils using 340-350° C. and irradiation in the range of 1-4 kGy/sec, and states that the paraffinic residue had a "strong tendency to polymerization" under these conditions. At irradiation doses of 1.4 and 2 kGy and dose rates above 2 kGy/sec, the results show the presence of a small light molecular weight fraction whose yield increases with dose rate. The Department of Energy report (Ibid, page 13, 2006) states that the Zaykin (*Rad. Phys. Chem.* 69:229-238, 2004) article showed the irradiation of the paraffinic Kumkol crude sample with a high paraffinic oil content tended to polymerize and that the samples had 10-15% of the mass as emulsified water, which could have greatly impacted the results. KZ Patent Application No. 970915.1 (Zaikina et al.) discloses a method for refining processed and residual petroleum using temperatures of 240-450° C., a dose of 1-80 kGy, and a dose rate of 1-60 kGy/s. KZ Patent Application No. 990377.1 (Zaikina et al.) discloses a method of purification of hydrocarbon resources in order to remove sulphurous compounds, using 10-100 kGy, a 0.1-10.0 kGy/sec dose rate and a temperature of 200-400° C. RU 2,142,496 to Pavlovich discloses a charged particle accelerator and working chamber for introducing a particle beam for the processing of petroleum products.

(see also: Kazakhstan Patent No. 970915.1 to Zaykina et al; and 990377.1 to Zaykina et al; and Russian Patent No. RU 2,142,496 to Pavlovich).

There exists a need for a method to efficiently extract and process heavy oils into light petroleum products that is cost effective, high yield and environmentally friendly.

SUMMARY OF THE INVENTION

The present invention is drawn to a method of processing heavy oils in general, and the more radiation resistant paraffinic oils in particular, using the radiation chemistry of polyethylene under the oxidizing conditions provided by the presence of oxygen (air) and/or ozone. The present invention includes methods to convert high molecular weight paraffin oils in petroleum to lower molecular weight fractions by exposure to sources of ionizing radiation such as gamma rays, high energy electrons, bremsstrahlung and X-rays in the presence of oxygen (air) and/or ozone. The process of the invention will result in a chain reaction for oxidative scission as the basis for a radiation processing for heavy paraffinic oils, a chain reaction whose yield increases with decreasing dose rate. High surface-to-volume ratio (high unit surface area of air per unit volume of oil) is emphasized in this process. The present invention also includes the radiation-induced conversion of high molecular weight aromatic oils in the presence of oxygen; in the processing of aromatic oils. The use of high surface-to-volume techniques and low processing temperatures further distinguish this invention from current technologies. Previous literature on aromatic oils show desirable effects using ionizing radiation but they describe experiments at temperatures too high and oils with a surface-to-volume ratios too low to take advantage of the methods of this invention.

Direct radiation-induced main chain scission of the high molecular weight hydrocarbon molecules in petroleum is low in yield. Irradiation is only the initiating step in the sequence of reactions in this invention. It produces transient species whose reactions (1) with oxygen (in the ambient air), (2) with ozone (in irradiated ambient air), and (3) with other species produced in the sequence result in the net molecular weight reduction of petroleum. Methods to maximize the role of the oxygen and ozone reactions by enhancement of the surface-to-volume ratio of petroleum during irradiation are among the important aspects of the present invention. It is noteworthy that oxidation methods and procedures included in the present invention can also be applied to the enhancement of the yields of low molecular weight products in the irradiation of both paraffinic and aromatic petroleum. The invention also teaches the conversion of metallic cationic solutes in the aqueous contaminants of petroleum to insoluble oxides and sulfides, and the conversion of organic sulfides in oil to water-soluble sulfides.

DETAILED DESCRIPTION OF THE INVENTION

"Paraffinic oils," also known as "waxy oils," as used herein is intended to include, but is not limited to mineral oils. Paraffinic oils have a more stable viscosity response to changing temperatures (high viscosity index). Paraffinic oils also have oxidation stability and are relatively non-reactive. As used herein, a normal paraffin, or alkane, is a saturated aliphatic hydrocarbon containing only —$CH_3$ and —$CH_2$— groups. A branched paraffin is a saturated aliphatic hydrocarbon compound such as

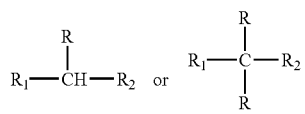

Where R, $R_1$ and $R_2$ are independent alkyl groups such as: —$CH_3$, —$C_2H_5$, —$C_3H_7$, or —$C_4H_9$ and so forth; and wherein $R_1$ and $R_2$ represent portions of the paraffin chain or backbone. Thus, a singly-branched paraffin has one R group per paraffin molecule, a doubly branched paraffin two R groups, a triply branched paraffin three R groups, and so forth. An aromatic oil will have a C:H ratio of about 1:1, and an aliphatic oil will have a C:H ratio of about 1:2. The ratios will differ slightly due to variations in side chains and branching.

"Viscosity," is generally meant to be a measure of a fluid's resistance to flow at a given temperature. It is ordinarily expressed in terms of the time required for a standard quantity of the fluid at a certain temperature to flow through a standard orifice. The higher the value, the more viscous the fluid. Since viscosity varies inversely with temperature, its value is meaningless unless accompanied by the temperature at which it is determined. With petroleum oils, viscosity is commonly reported in centistokes (cSt), measured at either 40° C. or 100° C. (ASTM Method D445—Kinematic Viscosity). Alternative terms for viscosity are in Saybolt Seconds Universal—SSU or SUS—or, for very viscous oils, in Saybolt Seconds Furol—SSF (ASTM Method D88). Other less common viscosity units are the Engler and redwood scales. Also terms used for viscosity are expressed as Brookfield Viscosity or poise.

"Viscosity index" (V.I.) is the measure of the rate of change of viscosity with temperature. Heating tends to make liquids thinner, whereas cooling tends to render liquids to a thicker consistency. The higher the V.I., the less the tendency for the viscosity to change. V.I. is determined by formula from the viscosities at 40° C. and 100° C. in accordance with the ASTM Test Method D567 or D2270. The latter test is required for V.I.s above 100. Paraffinic oils tend to be high in V.I., and the V.I. of any petroleum oil can be increased by the addition of a V.I. improver. Aromatic oils are lower in V.I.

"High paraffinic content" is meant herein to include oils or bitumen deposits containing at least about 5%, or at least about 6% or at least about 7% of paraffinic oils. Preferably, the amount is at least about 5.7% paraffinic oils.

"Heavy oil" as used herein is meant to include the high-boiling, relatively viscous fractions of petroleum or coal tar oils, tar sands, shale oils, bitumen deposits, oil sands, and the like. In the petroleum industry, viscosity is reported in units on the American Petroleum Institute (API) Scale. Extra heavy oil (bitumen) has an API gravity of less than 10° (higher than 1,000 kilograms/cubic meter). The Canadian government has only two classifications, with heavy oil having a specific gravity of greater than 900 kilograms/cubic meter (less than 25.7° API).

A less rigorous definition of heavy oil is oil that is "not recoverable in its natural state through a well by ordinary production methods." However, some heavy oil less than 22.3° API does flow very slowly but most requires heat or dilution to flow into a well or through a pipeline. Heavy oil from the Lloydminster area of Alberta and Saskatchewan has API gravities ranging from 9° to 18°. Heavy oil makes up about 15 percent of the world's remaining oil reserves. It usually contains impurities such as sulfur, heavy metals, waxes and carbon residue that must be removed or processed before the oil is refined.

The bitumen mined from the oil sands deposits in the Athabasca area of Alberta, Canada has an API gravity of around 8°, but can be treated to an API gravity of 31° to 33°. This upgraded oil is known as synthetic oil.

Oil sands are mixtures of sand, water, clay and crude bitumen. Each oil sand grain has three layers: an 'envelope' of water surrounding a grain of sand, and a film of bitumen surrounding the water (Canadian Centre for Energy Information, web page, 2006).

The present invention is drawn to extend the radiation chemistry of polyethylene under oxidizing conditions and to apply radiation to heavy oil which results in a chain reaction for oxidative scission as the basis for a radiation process for the heavy paraffinic oils. Process parameters such as oxygen/ozone, pressure, temperature, dose rate and dose are crucial. The temperature parameters of each individual petroleum sample will need to be optimal based upon viscosity and the solubility of oxygen and ozone in each sample. Solubility, diffusivity and the Henry's Law coefficients for oxygen and ozone as a function of temperature are also factors that are critical to the invention and is determined for the petroleum present in each petroleum field. A partial analysis of a petroleum sample obtained from the Campos Basin field in Brazil is presented in Table 1.

Kinetics of the oxidation reactions are determined to obtain a prediction of intrinsic problems such as sulfur compounds, transition metals and aromatic oils in any given oil sample. It must be recognized that paraffinic petroleum products may contain aromatic oils in comparable concentrations; kinetic analyses may optionally be performed as part of the present method in order to account for the effects of all of the components of the petroleum feed stock.

The invention additionally includes sensitizing the scission reactions with low concentrations of soluble additives and even insoluble ones including but not limited to titanium oxide.

Some of the effects cited above reinforce each other to enhance the product yield, while others parameters will reduce the product yield. One aspect of the invention includes the irradiation of thin films or foams in contact with air moving at high speeds through extended low energy, low dose rate electron beams or bremsstrahlung. Another aspect is the continuous processing in a tank(s) filled with oil which is bubbled with air (air sparging); the radiation source being the bremsstrahlung from an electron accelerator whose drift tube is inserted axially.

It is known that the presence of oxygen, oxygen-containing air, or ambient air, enhances the scission of high molecular weight hydrocarbons. (Charlesby A., *J. Am. Chem Soc., pp.* 60-74, 1953). Oxygen scavenges hydrocarbon radicals converting them to intermediate peroxide species that result in lower molecular weight products. Also the irradiation of oxygen itself leads to the formation of ozone which is particularly efficient in producing similar end effects. In the irradiation of oxygenated paraffinic substances such as hydrocarbon polymers and paraffinic petroleum, the energy of an incident electron beam or a gamma radiation field, is approximately proportional to the weight fraction of the two components. The volume fraction of oxygen in such systems is of the order of 0.01, but in gravimetric terms it is about a thousandth of that value. Also these values decrease with increasing temperature. Existing publications and claims in the processing of petroleum by irradiation methods show an awareness of the beneficial role of oxygen. (Charlesby, A., Ibid, 1953) They demonstrate efforts to decrease the temperature requirements to maximize oxygen content and "irradiated air" but high enough to maintain a viscosity suitable for rapid processing. However, the disclosures never included either the methods or the concentration sufficient to demonstrate any effects, and practical methods for radiation-induced high yield oxidative degradation of paraffinic oils were not disclosed.

Yet another embodiment or aspect is the irradiation of a fog or mist consisting of small petroleum droplets dispersed in air. The fog is formed when the liquid petroleum is forced through an atomizer into air flowing past the window of an electron accelerator. Bubbling air through petroleum even to the extent of creating a foam (including added surfactants where necessary), or a "fog" prior to and/or during exposure of the heterogeneous petroleum combination to radiation that constitute the present invention. In all circumstances, the weight fraction of the petroleum liquid would be dominant even though, unlike in oxygen-liquid solutions, its volume fraction could be much lower. "Sparging" with air introduced by means of high pressure through a frit is the simplest means of enhancing the petroleum surface area exposed to air.

The advantages are two-fold: (1) because of the higher surface to-volume ratio of air to liquid, oxygen concentration is guaranteed to be near its saturation level throughout irradiation (in thin oil films, oxygen consumed during irradiation is rapidly replaced by diffusion) and (2) the irradiation of a foam or a fog can be performed highly efficiently with inexpensive (low cost per kW and per kWh) electron accelerators with energies lower than 0.2 MeV. On the other hand, satisfactory irradiation of the air-saturated bulk liquid cannot be done without the use of more expensive accelerators that produce electron energies of at least 1 MeV and, more practically speaking, above 2 MeV.

The energy is deposited in the oil and the oxygen in air in proportion to their mass fractions in the fog. The irradiated oil reacts with the oxygen leading to the formation of degradation products. The irradiated liquid fraction contains lower molecular weight petroleum compounds; the gaseous fraction contains ozone and oxidizing nitrogen-oxygen products capable of initiating similar reactions. The effluent irradiated oil is condensed (and set to an optimum temperature for post-irradiation cracking, metal and sulfur removal, etc.); and the irradiated air is recycled. With inexpensive 100-500 keV electrons the diameter of the tube through which the fog flows may be more than a meter depending on the bulk density of the fog.

The advantage is that the flow rate and bulk density of the fog are independent parameters that can be adjusted to accommodate the use of electrons in the energy range of 0.05-0.5 MeV over a wide range of current density. In all applications of the present invention, additives may be used to enhance the physical processing properties. The invention also includes the desired radiation chemistry of the petroleum containing oxygen (air) and additives such as but not limited to ozone (which is produced in irradiation of oxygen) and $TiO_2$.

The present invention also uses an electron, gamma, X-ray or bremsstrahlung source which can provide a continuous constant dose rate. A beam consisting of high intensity short pulses separated by time periods long relative to the pulse width but producing the same time-averaged dose rate as a continuous beam is much less efficient in producing the oxidation (followed by molecular weight decrease), and more efficient in causing parasitic reactions such as dismutation, or reactions such as cross-linking which tend to increase the molecular weight. A continuous source of electrons or high energy photons is required in the invention in order to maximize the probability for a hydrocarbon molecule converted by the electron source to a free radical to react with the scavenger oxygen or ozone moiety (and undergo chain degradation) relative to the probability that the radicals react to terminate the reaction by dismutation or, even worse, cross-linking. Electron beams produced by linear accelerators, which are commonly used in the art (see Mirkin et al. 2003, Ibid; Zaykin et al., 2004, Ibid) for processing of petroleum products provide the electron bean in pulses, (see Zavyalov et al., pp. 1-3, presented at the *XVI International Workshop on Charged Particle Linear Accelerators*, Alushta, Crimea, Ukraine, 1999), emit narrow, intense pulsed (for example, a pulse width of 1 µsec), with pulses spaced 1 msec apart. The pulsing creates a tendency for each cleaved hydrocarbon moiety to form cross linked molecules with other hydrocarbon molecules, thus providing polymerization of longer hydrocarbon, rather than the desired shorter molecules.

Although there is a substantial body of literature describing the irradiation of petroleum to form lower molecular weight fractions, such technologies have been confined to oils that (1) are aromatic in character and involve (2) high temperatures (>250 degrees Celsius) and (3) high time-averaged absorbed dose rates (>100,000 gray per hour). In contrast, the subject invention applies to the radiation-induced degradation of aliphatic hydrocarbon oils which is favored by low temperatures, low dose rates and the presence of additives such as oxygen and ozone.

The present invention is meant to enhance oxidation and scission of products with a higher efficiency and a higher yield of lower molecular weight products. The process of the invention involves a dose rate of 0.0005-10 kGy/s with no more than 30 kGy dose, achievable using a gamma source ($^{60}$Co), a low energy electron machine, or bremsstrahlung from a high energy electron machine; a temperature range of 50-250° C.; and the introduction of oxygen (air) or ozone as a free radical scavenger (and additional additives) into the oil mixture prior to irradiation. The temperature can be in the range of 50-100° C., 50-200° C., 50-150° C., 75-10° C., 75-150° C., 75-200° C., 75-250° C., 100-200° C., 100-250° C., 150-200° C., 150-250 or 200-250° C.

The basis for the invention is the known radiation-induced degradation of aliphatic hydrocarbon polymers such as polyethylene and paraffins. Irradiation of polyethylene and paraffins at high dose rates (and even in the presence of oxygen) induces cross-links leading to higher molecular weight, gel formation and enhanced mechanical properties. (Seguchi et al., *Rad. Phys. Chem.*, 37:29-35, 1991; Tabata, Y. *ACS Symposium Series*, 475:31-43, 1991; Seguchi, T., *ACS Symposium Series*, 475; 442-456, 1991; Seguchi et al., *Rad. Phys. Chem.* 37(1):141-146, 1991)

The principal consequences of irradiation of polyethylene at low dose rates and in the presence of oxygen (air) and/or ozone are random chain scissions with a decrease of molecular weight and degradation in mechanical properties. Another basis for the present invention is that polyethylene has a "ceiling" temperature of 45 degrees Celsius, beyond which the principal chemical effect is the successive separation of ethylenic groups rather than random scission. It is the tendency of radiation to crosslink paraffinic oils and the inability of high temperatures to do much more than evolve gaseous products which has thus far precluded practical interest in the radiation processing of paraffinic petroleum.

The optimum processing conditions in the present invention require (1) temperatures low enough for high oxygen solubility, but high enough to provide a low viscosity conditions for the free flow of oil, and (2) the lowest possible dose rate consistent with high production rates. These considerations lead to processing concepts in which the feed petroleum may be aerated to produce a foam; alternatively, additives may be introduced to produce optimum size "bubbles". Additionally, alternative electron source technology may be used, such as a highly defocused low energy beam irradiating a rapidly flowing aerated film of petroleum.

This novel technology may include augmentation by other additives whose effect, like that of oxygen, will be to prevent the radiation-induced free radicals present in oil sources not only from combining as cross-linked pairs but also to induce their scission.

WORKING EXAMPLES

Example 1

Table 1 describes the approximate analysis of the characteristics of a heavy oil sample from the Campos Basin in Brazil.

TABLE 1

| | |
|---|---|
| Density (°API) | 19.9 |
| Relative density (at 20/4° C.) | 0.9310 |
| Vapor pressure Reid (kPa) | 16.6 |
| Flow point (° C.) | −33 |
| Viscosity (cp) | |
| At 20.0° C. | 20-400 |
| At 30.0° C. | 14-280 |
| At 50.0° C. | 8-170 |
| Wax (% m/m) | 1.92 |
| Asphaltenes (% m/m) | 2.5 |
| Hydrocarbons (% m/m) | |
| Saturated | 40.5 |
| Aromatics | 29.0 |
| Resins | 28.0 |
| Sulphur (% m/m) | 0.74 |
| Mercaptidic sulphur (mg/kg) | 17 |
| Nitrogen (% m/m) | 0.47 |
| Metals (mg/kg) | 1 |
| Nickel | 20 |
| Vanadium | 25 |
| Salt (mg NaCl/L) | 46.03 |
| Water by distillation (% v/v) | 0.200 |
| Water and sediments (% v/v) | 0.05 |

The method of the present invention includes the radiation source is an electron beam or combined with a $^{60}$Co source. The temperature of the reaction includes 50-100° C., 50-200° C., 50-150° C., 75-100° C., 75-150° C., 75-200° C., 75-250° C., 100-200° C., 100-250° C., 150-200° C., 150-250 and 200-250° C. and also includes a petroleum source as coal tar oils, tar sands, shale oils, bitumen, and oil sands, or a combination thereof. The present method additionally includes batch processing and continuous flow processing, or a combination of both. The processing can be preceded by a step which removes sand, shale, or non-petroleum product and can also include a step to remove gaseous products produced by the method, the gaseous products including hydrogen, methane, ethane, propane, butane, and the like. The method additionally includes a dose rate including 0.5, 1.0, 1.5, 2.0, 2.5, 3.0, 3.5, 4.0 kGy/s, or a spatial dose rate distribution arising from the energy and the attenuation properties of the radiation source, and the geometry and composition of the reactor oil/oxygen system.

The invention additionally includes a method wherein an additional step comprises bubbling an oxygen-containing gas or ozone through the oil, either paraffinic or aromatic in a composition, to create a foam prior to or during the exposure of the oil sample to radiation. The method also includes the addition of surfactants to the oil mixture.

The radiation-induced degradative reaction of aliphatic hydrocarbons with oxygen can proceed by the following mechanism:

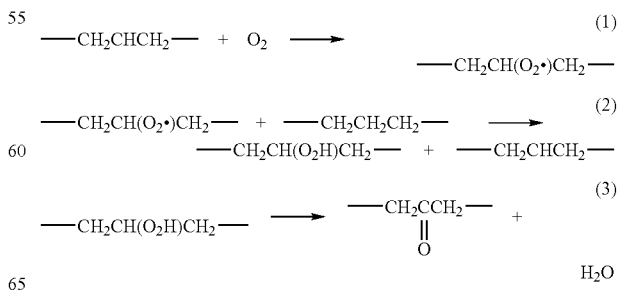

-continued

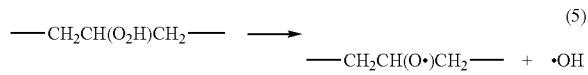

Reaction (1) shows the oxidation of the radiolytically produced C-centered radicals to peroxyl radicals. This well-established reaction involving the oxygen dissolved in oil is complete within less than a millisecond. This peroxyl radical proceeds in sequence to the most important step, reaction (4). In this reaction the desired fragmentation of an alkane molecule occurs while, at the same time, a C-centered free radical is also produced, one that can undergo the same sequence leading to lower molecular weight products without the addition of more radiation energy. Reactions (2) and (5) are also important in continuation of the chain.

The Removal of Sulfur Compounds in Oil

In general, sulfur compounds such as sulfides, thiols, disulfides, and thiophenes react readily with ionizing radiation. Electrons produced by the initial ionizing event react very rapidly with these sulfur compounds releasing the thiol group and producing free radicals and the anion $[HS]^-$ as shown in reaction (6). $[HS]^-$ anions undergo protonation reactions and are converted to $H_2S$ gas which is readily separable from oil.

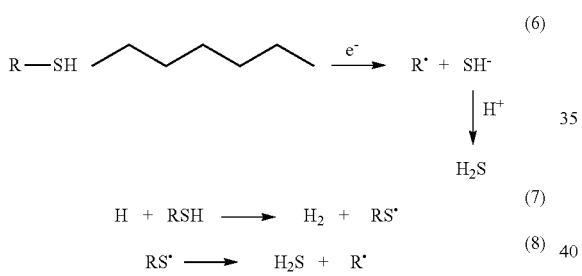

The invention includes method of processing paraffinic and/or aromatic oils comprising irradiating a sample of heavy oils comprising paraffinic oils higher than 5.7%,
with a dose rate of 0.5-4 kGy/s, with the proviso that the dosage not exceed 3 kGy,
a temperature range of 50-250° C., and
the introduction of oxygen (air) and/or ozone prior to irradiation.

The invention also includes a method wherein the radiation source is an electron beam, and wherein the radiation source comprises an electron beam, bremsstrahlung and X-rays, and wherein the radiation source is a $^{60}Co$ source. The temperature of the reaction is selected from the group consisting of: 50-100° C., 50-200° C., 50-150° C., 75-100° C., 75-150° C., 75-200° C., 75-250° C., 100-200° C., 100-250° C., 150-200° C., 150-250 and 200-250° C., or a simultaneous distribution of temperatures with maximum of 250° C. Additionally, the sample of heavy oil includes coal tar oils, tar sands, shale oils, bitumen, oil sands and a combination thereof, wherein the processing comprises batch processing and/or continuous flow processing. The processing can be preceded by a step which removes sand, shale, or non-petroleum products. The method also includes a step to remove gaseous products produced by the method of the invention. The gaseous products include hydrogen, methane, ethane, propane, butane and a combination thereof. The dose rate includes 0.5, 1.0, 1.5, 2.0, 2.5, 3.0, 3.5, 4.0 kGy/s, and a continuous spatial dose distribution with a maximum of 4 kGy/sec. A further method step includes bubbling oxygen-containing gas through the paraffinic or aromatic oil to create a foam prior to the exposure of the oil sample to radiation, and also wherein surfactants are added to the paraffinic or aromatic oil mixture. The oxygen-containing gas can be ozone or ambient air. Also, sulfur-containing compounds can be converted to $H_2S$ gas which is separated from the oil.

This invention, now fully described, will be understood to those of ordinary skill in the art that the same can be performed within a wide and equivalent range of conditions, formulations, and other parameters without affecting the scope of the invention or any embodiment thereof. All patents and publications cited herein are incorporated by reference in their entirety.

We claim:

1. A method of processing paraffinic and aromatic oils comprising:
providing a paraffinic oil mixture consisting of heavy oils, oxygen-containing gas introduced under pressure to maximize the surface-to-volume ratio of air to oil, contaminants found in the natural state of an oil deposit, additives which have an effect to prevent the radiation-induced free radicals present in an oil source from cross-linking, added surfactants and optionally titanium oxide;
said heavy oils comprising paraffinic oils higher than 5.7%;
irradiating said paraffinic oil mixture with an electron beam;
providing a constant dose rate in an energy range of 0.05 to 0.5 MeV at a dose rate of 0.5-4 kGy/sec;
in a temperature range of 50-250° C.;
with introduction of an oxygen-containing gas prior to said irradiating;
maintaining an oxygen concentration near its saturation level throughout the irradiation; and
resulting thereby in a chain reaction for oxidative scission to obtain lower molecular weight fractions.

2. The method of claim 1, wherein the temperature is selected from the group consisting of: 50-100° C., 50-200° C., 50-150° C., 75-100° C., 75-150° C., 75-200° C., 75-250° C., 100-200° C., 100-250° C., 150-200° C., 150-250° C. and 200-250° C., or a simultaneous distribution of temperatures with maximum of 250° C.

3. The method of claim 1 wherein the heavy oils are selected from the group consisting of coal tar oils, tar sands, shale oils, bitumen, oil sands and a combination thereof.

4. The method of claim 1 wherein said processing comprises batch processing.

5. The method of claim 1 wherein said processing comprises continuous flow processing.

6. The method of claim 1 wherein said processing is preceded by a step which removes sand, shale, or non-petroleum products.

7. The method of claim 1 wherein said processing includes a step to remove gaseous products produced by said method.

8. The method of claim 7 wherein said gaseous products are selected from the group consisting of hydrogen, methane, ethane, propane, butane and a combination thereof.

9. The method of claim 1 wherein the dose rate is selected from the group consisting of 0.5, 1.0, 1.5, 2.0, 2.5, 3.0, 3.5, 4.0 kGy/sec, and a continuous spatial dose distribution with a maximum of 4 kGy/sec.

10. The method of claim 1, wherein maintaining an oxygen concentration near its saturation level comprises bubbling oxygen-containing gas through the paraffinic oil mixture to create a foam prior to the exposure of the oil sample to radiation.

11. The method of claim 1, wherein the irradiating is carried out using a defocused electron beam.

12. The method of claim 1, additionally comprising continuous addition of the oxygen-containing gas.

13. A method for processing paraffinic heavy oil, comprising the steps of:
   dispersing droplets of the oil in an oxygen-containing gas to form a fog of oil in air in a reaction chamber;
   maintaining an oxygen concentration near its saturation level throughout the irradiation;
   irradiating the fog of oil in the reaction chamber by a defocused electron beam providing a constant dose rate in an energy range of 0.05 to 0.5 MeV at a dose rate of 0.5-4 kGy/sec, at a temperature of 50-250° C.; and
   wherein said irradiating resulting in a chain reaction for oxidative scission, to obtain thereby lower molecular weight fractions of the heavy oil.

* * * * *